(12) United States Patent
Orr et al.

(10) Patent No.: US 7,626,938 B1
(45) Date of Patent: Dec. 1, 2009

(54) LOCAL AREA NETWORK SWITCH USING CONTROL PLANE PACKET MIRRORING TO SUPPORT MULTIPLE NETWORK TRAFFIC ANALYSIS DEVICES

(75) Inventors: Michael Orr, Sunnyvale, CA (US); David Melman, D.N. Bikat Beit Hakerem (IL); Tsahi Daniel, Tel-Aviv (IL)

(73) Assignees: Marvell Israel (M.I.S.L) Ltd., Yokneam (IL); Marvell International Ltd., Hamilton (BM)

( * ) Notice: Subject to any disclaimer, the term of this patent is extended or adjusted under 35 U.S.C. 154(b) by 529 days.

(21) Appl. No.: 11/094,980

(22) Filed: Mar. 31, 2005

(51) Int. Cl.
*G01R 31/00* (2006.01)
(52) U.S. Cl. ...................... 370/251; 370/357
(58) Field of Classification Search ......... 370/250–251, 370/229, 235, 357
See application file for complete search history.

(56) References Cited

U.S. PATENT DOCUMENTS

| | | | | |
|---|---|---|---|---|
| 5,754,768 | A * | 5/1998 | Brech et al. | 709/230 |
| 6,041,042 | A * | 3/2000 | Bussiere | 370/245 |
| 6,621,829 | B1 | 9/2003 | Achilles et al. | |
| 7,185,103 | B1 * | 2/2007 | Jain | 709/234 |
| 2004/0003094 | A1 * | 1/2004 | See | 709/227 |
| 2004/0049602 | A1 * | 3/2004 | MacBride | 709/250 |
| 2004/0196841 | A1 | 10/2004 | Tudor et al. | |

FOREIGN PATENT DOCUMENTS

WO  WO 2004/025884  3/2004

* cited by examiner

*Primary Examiner*—Seema S Rao
*Assistant Examiner*—Mon Cheri S Davenport

(57) ABSTRACT

An Ethernet network device includes a port logic module that is associated with a device port of the Ethernet network device. A packet processing module includes an ingress processing module that receives an incoming packet and that generates a control traffic tag. An ingress command execution module receives the incoming packet and the control traffic tag, generates a duplicate packet that is identical to the incoming packet, and generates a device interface code that identifies the port logic module based on the control traffic tag. A control traffic routing module receives the duplicate packet and the device interface code and forwards the duplicate packet to the port logic module. A network traffic analysis device receives the duplicate packet. The port logic module replaces a first destination header of the duplicate packet with a second destination header that is identical to a destination header of the incoming packet.

27 Claims, 6 Drawing Sheets

| Controlled Traffic Code | Processor Interface Identification | Device Identification |
|---|---|---|
| A | 2 | Controlled Traffic Processor A |
| B | 3 | Port X - Network Analyzer A |
| C | 1 | Controlled Traffic Processor B |
| D | 5 | Controlled Traffic Processor B |
| E | 4 | Port Y - Network Analyzer B |

FIG. 5

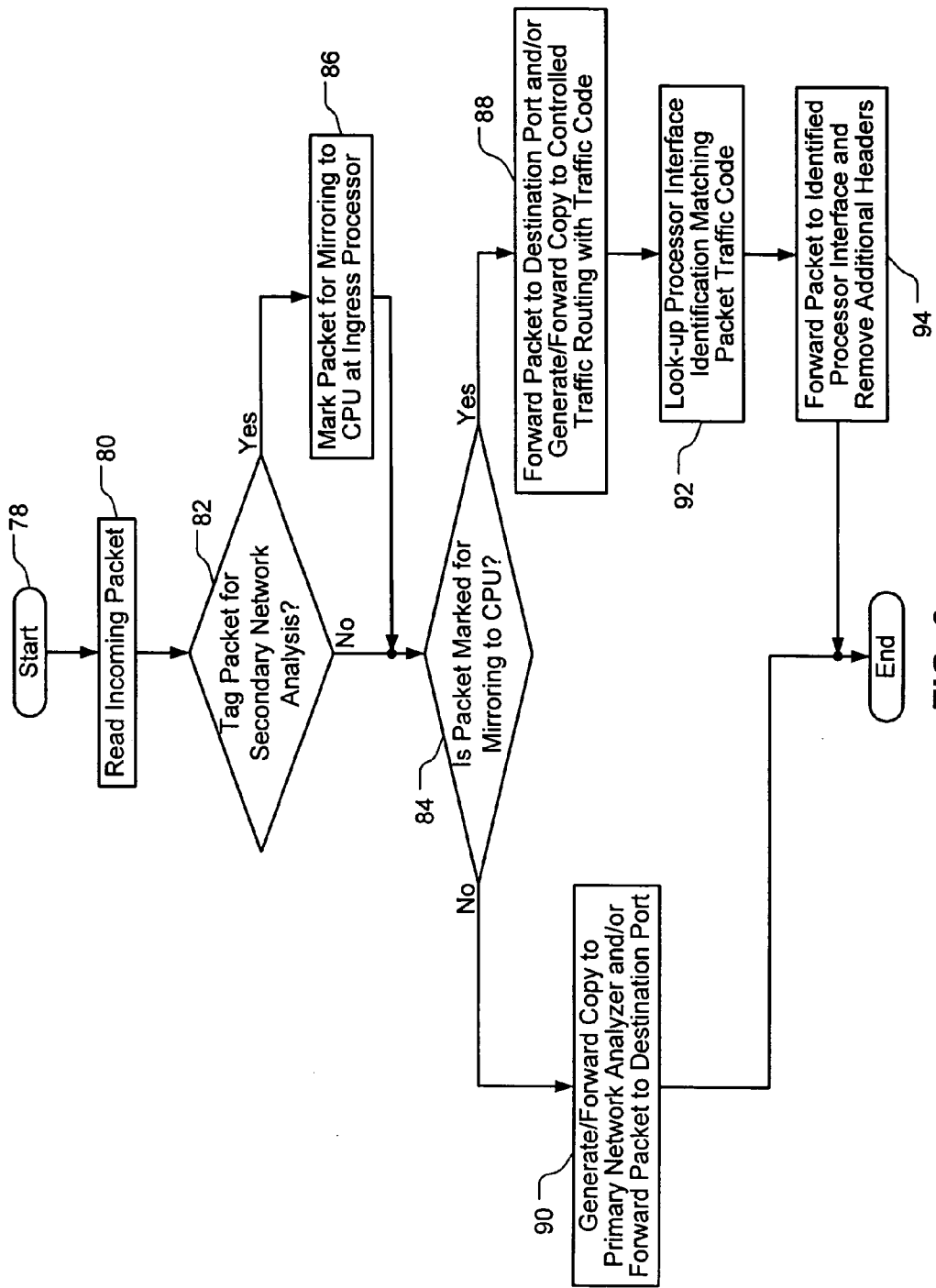

LOCAL AREA NETWORK SWITCH USING CONTROL PLANE PACKET MIRRORING TO SUPPORT MULTIPLE NETWORK TRAFFIC ANALYSIS DEVICES

FIELD OF THE INVENTION

The present invention relates to Ethernet network traffic analysis, and more particularly to Ethernet network traffic analysis in local area network (LAN) switches.

BACKGROUND OF THE INVENTION

Network traffic analysis devices, sometimes called packet sniffers, are devices that capture, monitor, and/or analyze computer network traffic. For example, a network traffic analysis device may be used to capture data that is transmitted on a computer network over a predetermined time period. The network traffic analysis device stores the data during the predetermined time period, and the data may be subsequently recovered and analyzed. Typical applications for network traffic analysis devices include bottleneck detection, diagnostic testing, and security verification.

Network traffic analysis devices are commonly connected to computer networks through Ethernet network devices such as hubs or local area network (LAN) switches. The network traffic analysis devices may be assigned to monitor one or more ports of the Ethernet network device. However, it is easier to monitor a wider range of network traffic in a hub that in a LAN switch. This is because hubs are typically shared network devices in which each port of the hub sees every packet that enters or leaves every other port. However, in switches only intended destination ports receive copies of packets. Therefore, switches require a mechanism for generating copies of packets from desired ports.

Referring to FIG. 1, an Ethernet network device 10 such as a LAN switch includes a packet processing module 12 and ports 14 through which network communications devices communicate. The Ethernet network device 10 may also communicate with a distributed communications system 16 such as the Internet. A network traffic analysis device 18 is connected to a port 14-8 of the Ethernet network device 10 (Port 8 in FIG. 1). The network traffic analysis device 18 communicates with the packet processing module 12 and identifies desired ports 14 from which network traffic is captured and/or monitored. The network traffic analysis device 18 may receive network traffic from a single port 14-1, 14-2, 14-3, 14-4, 14-5, 14-6, 14-7, or 14-8 or multiple ports 14 of the Ethernet network device 10. Additionally, the network traffic analysis device 18 may specify whether incoming network traffic, outgoing network traffic, or both are desired for each port 14-1, 14-2, 14-3, 14-4, 14-5, 14-6, 14-7, and/or 14-8. Referring now to FIG. 2, the packet processing module 12 includes an ingress processing module 26 that receives an incoming packet from a port 14-1, 14-2, 14-3, 14-4, 14-5, 14-6, 14-7, or 14-8 of the Ethernet network device 10. The ingress processing module 26 generates tags that indicate desired actions to be taken with the incoming packet. For example, a tag may indicate a desire to drop the incoming packet. If the port 14-1, 14-2, 14-3, 14-4, 14-5, 14-6, 14-7, and/or 14-8 of the incoming packet is currently being monitored by the network traffic analysis device 18, the ingress processing module 26 generates an analyzer mirroring tag. The analyzer mirroring tag indicates that a copy of the packet is to be mirrored to the network traffic analysis device 18.

The packet processing module 12 includes an ingress command execution module 28 that receives the incoming packet and any associated tags. Unless the tags include an instruction to drop the packet, the ingress command execution module 28 forwards the packet to an intended destination port 14-1, 14-2, 14-3, 14-4, 14-5, 14-6, 14-7, and/or 14-8 of the Ethernet network device 10. The ingress command execution module 28 also executes any actions identified by the tags. When the ingress command execution module 28 receives an analyzer mirroring tag with a packet, the ingress command execution module 28 generates a copy of the incoming packet.

The ingress command execution module 28 forwards the copy of the incoming pack to the port 14-8 of the Ethernet network device 10 where the network traffic analysis device 18 is connected (for example, port 8 in FIG. 2). The network traffic analysis device 18 essentially eavesdrops on the identified port(s) 14-1, 14-2, 14-3, 14-4, 14-5, 14-6, 14-7, and/or 14-8. Therefore, it is important that the copy of the packet that is received by the network traffic analysis device 18 is as identical to the original incoming packet as possible.

Typically, packet processing modules 12 in Ethernet network devices 10 only support a single network traffic analysis device 18 at a given time. This is because network traffic analysis devices 18 are very expensive. Additionally, it is difficult and expensive to hire personnel qualified to interpret data from network traffic analysis devices 18. However, it may be beneficial for a single packet processing module 12 in an Ethernet network device 10 to support multiple network traffic analysis devices 18. For example, a network administrator may wish to utilize a first network traffic analysis device 18 that is programmed to automatically perform a first task such as network security verification. In addition, the network administrator may wish to utilize a second network traffic analysis device 18 to perform another task. This requires the packet processing module 12 to generate at least three copies of an incoming packet, including the copy that is forwarded to the intended destination port 14-1, 14-2, 14-3, 14-4, 14-5, 14-6, 14-7, and/or 14-8.

In one approach, a packet processing module 12 is designed with additional hardware to support multiple network traffic analysis devices 18. This requires both hardware to generate another copy of an incoming packet and hardware that decides where to send the additional copy of the packet. However, the added space requirements and complexity of the additional hardware may be cost prohibitive.

In another approach, a packet processing module 12 utilizes traffic classification tags to direct copies of packets to egress interfaces. In this case, additional network traffic analysis devices 18 may be connected to the egress interfaces. However, packets forwarded in this manner are typically not exact copies of incoming packets and are changed during the forwarding process.

SUMMARY OF THE INVENTION

An Ethernet network device according to the present invention includes a first port logic module that is associated with a device port of the Ethernet network device. A packet processing module includes an ingress processing module that receives an incoming packet and that generates a control traffic tag. An ingress command execution module receives the incoming packet and the control traffic tag, generates a first duplicate packet that is identical to the incoming packet, and generates a device interface code that identifies the first port logic module based on the control traffic tag. A control traffic routing module receives the first duplicate packet and the device interface code and forwards the first duplicate packet to the first port logic module.

In other features, a system comprises the Ethernet network device and a network traffic analysis device that communicates with the first port logic module and that receives the first duplicate packet. The Ethernet network device includes a second port logic module that transmits the incoming packet to the ingress processing module. The ingress command execution module generates a device interface code that identifies the first port logic module when the network traffic analysis device monitors network traffic through the second port logic module.

In still other features of the invention, a system comprises the Ethernet network device and a network traffic analysis device. The Ethernet network device includes a second port logic module. The ingress command execution module generates a second duplicate packet that is identical to the incoming packet and forwards the second duplicate packet to the second port logic module. The network traffic analysis device communicates with the second port logic module and receives the second duplicate packet. The first port logic module replaces a first destination header of the first duplicate packet with a second destination header that is identical to a destination header of the incoming packet.

In yet other features, a system comprises the Ethernet network device and a network traffic analysis device. The Ethernet network device includes a second port logic module that transmits the incoming packet to the ingress processing module. The ingress processing module generates the control traffic tag when the network traffic analysis device monitors network traffic through the second port logic module. The packet processing module includes at least one control traffic processor. The control traffic routing module forwards a first packet to the control traffic processor when a device interface code of the first packet identifies an interface between the control traffic processor and the control traffic routing module.

In still other features of the invention, a system comprises the Ethernet network device and a second port logic module. The ingress command execution module forwards the incoming packet to the second port logic module when a destination header of the incoming packet identifies the second port logic module. The Ethernet network device is a local area network (LAN) switch.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a table illustrating an exemplary control traffic code look-up table; and FIG. 6 is a flowchart illustrating steps performed by the packet processing module to generate a copy of a packet for network traffic analysis using packet mirroring.

DETAILED DESCRIPTION OF THE PREFERRED EMBODIMENTS

Figure 1:
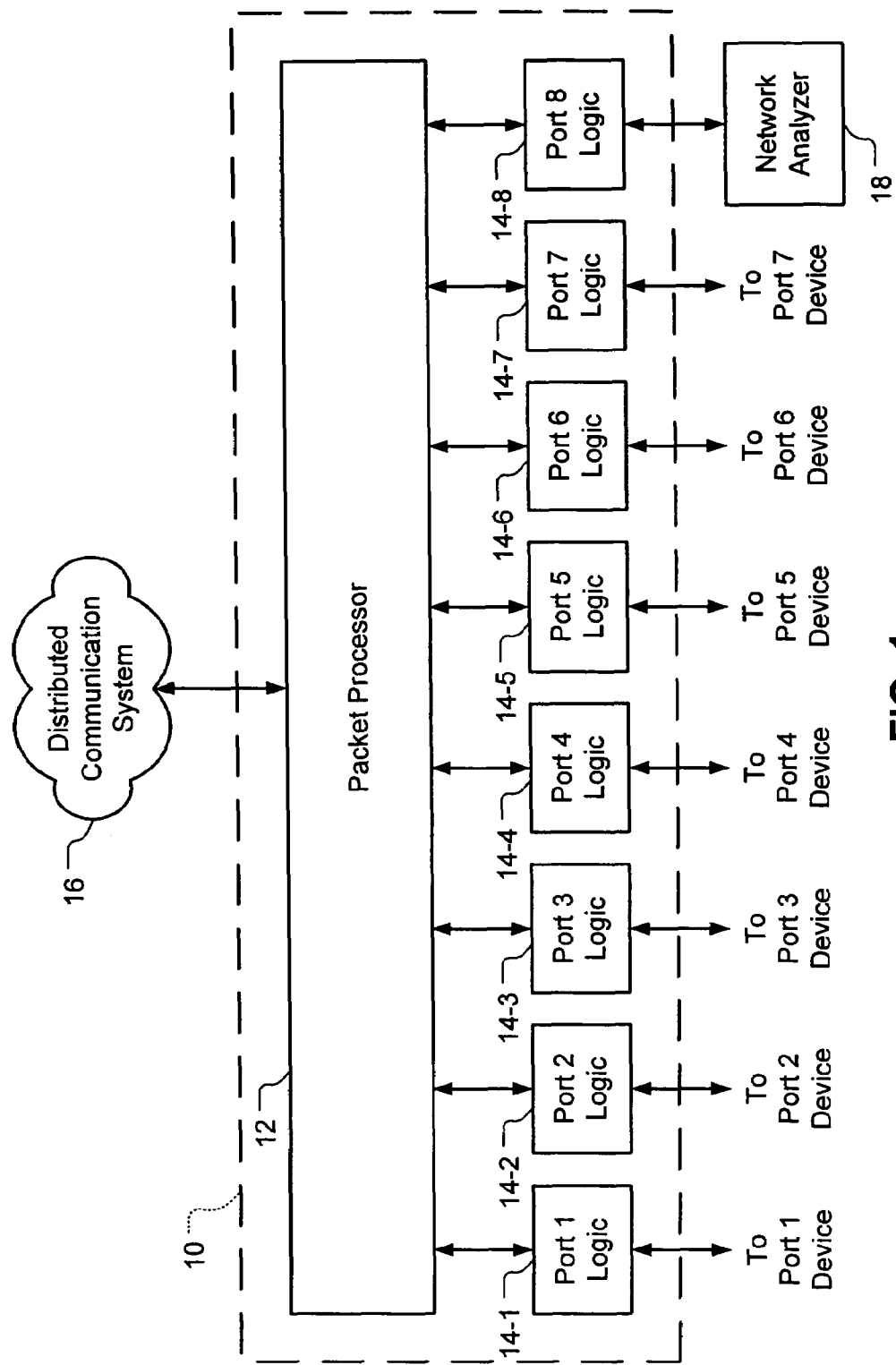
FIG. 1 is a functional block diagram of an Ethernet network device that communicates with a network traffic analysis device and that includes a packet processing module according to the prior art.
Figure 2:
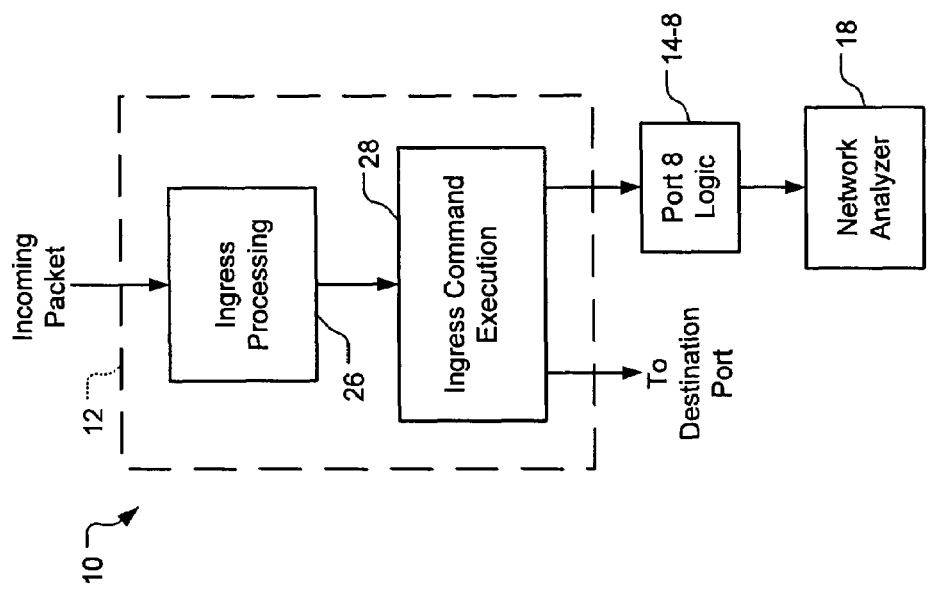
FIG. 2 is a functional block diagram of the packet processing module of FIG. 1 illustrated in further detail according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

It is desirable for a packet processing module to support a way to identify and send frames to a central processing unit (CPU). For example, the packet processor may first generate a copy of the frame and send the copy of the frame to the CPU. The packet processor may also be capable of sending copies of frames to one of multiple CPUs that are present in the system. In this case, the packet processor may generate multiple copies of incoming frames and send the copies of the frames to specific system ports. In this case, the system effectively supports multiple concurrent traffic analyzers when traffic analyzers are connected to the system ports instead of CPUs.

Figure 3:
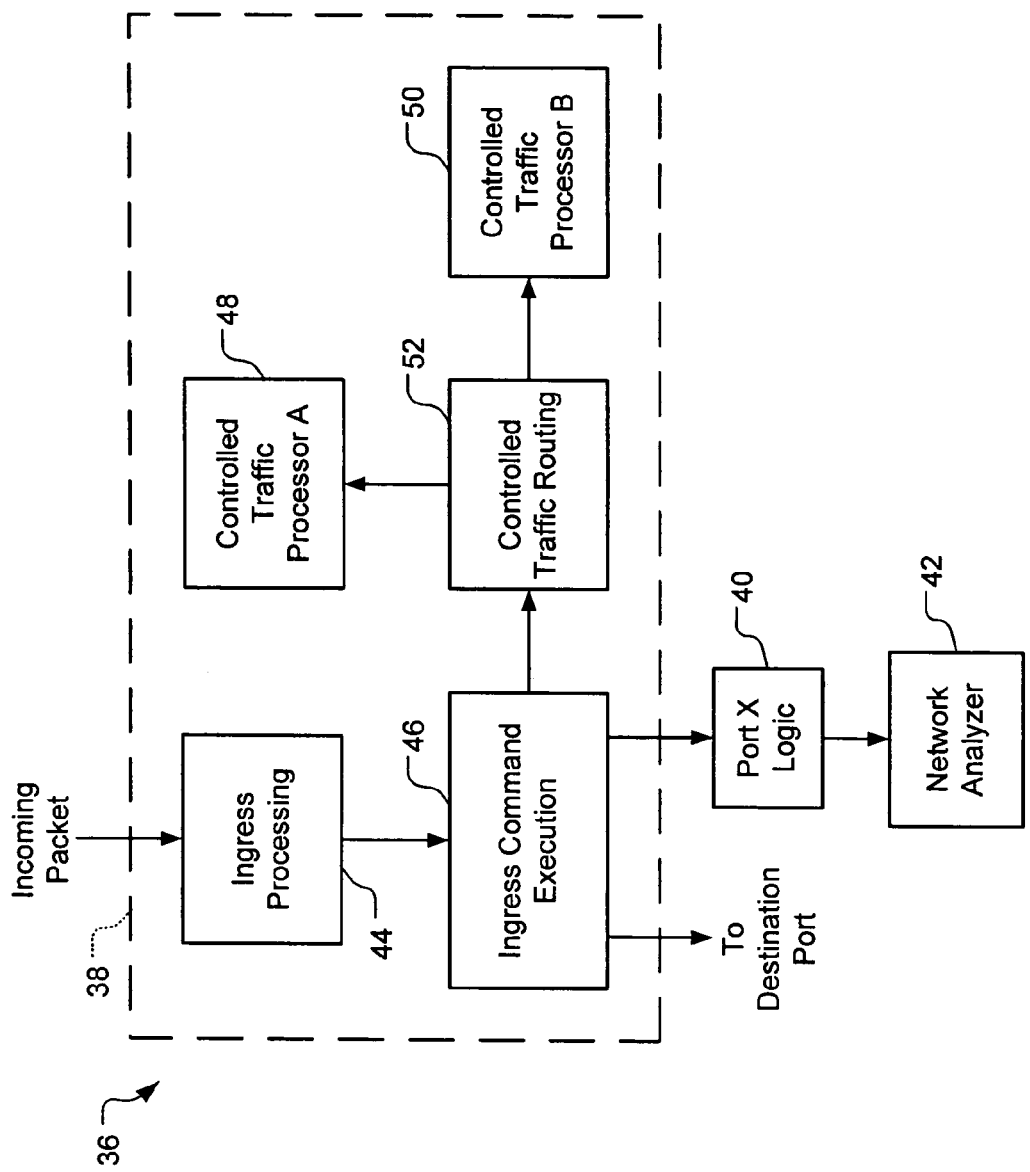
FIG. 3 is a functional block diagram of an Ethernet network device that includes a packet processing module with multiple control traffic processors according to the present invention.

Referring now to FIG. 3, an Ethernet network device 36 such as a local area network (LAN) switch includes a packet processing module 38 and a port logic module 40. The port logic module 40 is identified as "X" and may communicate with any port of the Ethernet network device 36. A network traffic analysis device 42 communicates with the port logic module 40 and monitors incoming and/or outgoing traffic through one or more of the ports of the Ethernet network device 36. The packet processing module 38 includes an ingress processing module 44 that receives an incoming packet from a port of the Ethernet network device 36.

The ingress processing module 44 generates any required tags for the incoming packet. For example, the ingress processing module 44 may generate a packet dropping tag when the packet it to be dropped. The ingress processing module 44 may also generate an analyzer mirroring tag when the network traffic analysis device 42 monitors the port where the incoming packet originated. The packet processing module 38 includes an ingress command execution module 46 that receives the incoming packet and any associated tags.

Unless the tags include a packet dropping tag, the ingress command execution module 46 forwards the packet to an intended destination port of the Ethernet network device 36. The ingress command execution module 46 also executes actions identified by the tags. For example, when the tags include the analyzer mirroring tag, the ingress command execution module 46 generates a copy of the packet that is identical to the incoming packet. The ingress command execution module 46 forwards the copy of the incoming packet to the port logic module 40, which communicates with the network traffic analysis device 42.

Packet processing modules 38 are typically only capable of generating one copy of an incoming packet for network traffic analysis. However, packet processing modules 38 may also identify packets as belonging to a control traffic class. Packet processing modules 38 typically include at least one dedicated processor 48 or 50 to process packets belonging to the control traffic class. However, packet processing modules 38 may also include multiple control traffic processors 48 and 50. This is particularly useful when incoming packets are implemented in different protocols. In this case, packets implemented in first protocol may be forwarded to a first control traffic processor 48, and packets implemented in a second protocol may be forwarded to a second control traffic processor 50. This is useful in alleviating a large burden on a main processor of the packet processing module 38.

Packets that are designated as belonging to the control traffic class may be mirrored or forwarded to a control traffic processor 48 or 50. Additional copies of the packets are typically not made when the packets are forwarded to a control traffic processor 48 or 50. In this case, an original copy of a packet is set to the control traffic processor 48 or 50. However, mirroring a packet is functionally equivalent to generating an identical copy of the packet. In this case, the original copy of the packet is sent to its intended destination and the identical copy of the packet is sent to a control traffic processor 48 or 50. To identify a packet as belonging to the control traffic class, the ingress processing module 44 generates a processing mirror tag. In this case, the ingress command execution module 46 receives the incoming packet and the processing mirror tag.

The processing mirror tag instructs the ingress command execution module 46 to mirror the incoming packet, which generates another duplicate copy of the incoming packet. The ingress command execution module 46 also generates a device interface code, which identifies a device that is to receive the mirrored packet. In an exemplary embodiment, the ingress command execution module 46 generates the device interface code based on a protocol in which the mirrored packet is implemented. Alternatively or additionally, the ingress command execution module 46 may generate the device interface code based on the port from which the incoming packet originated, or any useful frame attribute or contents of frame header fields.

The packet processing module 38 includes a control traffic routing module 52 that receives the mirrored packet and the device interface code from the ingress command execution module 46. The control traffic routing module 52 utilizes a look-up table to match the device interface code with the location of the indicated system device. For example, the system device may be one of first and second control traffic processors 48 and 50, respectively, illustrated in FIG. 3. The control traffic routing module 52 then forwards the mirrored packet to the appropriate device.

Figure 4:
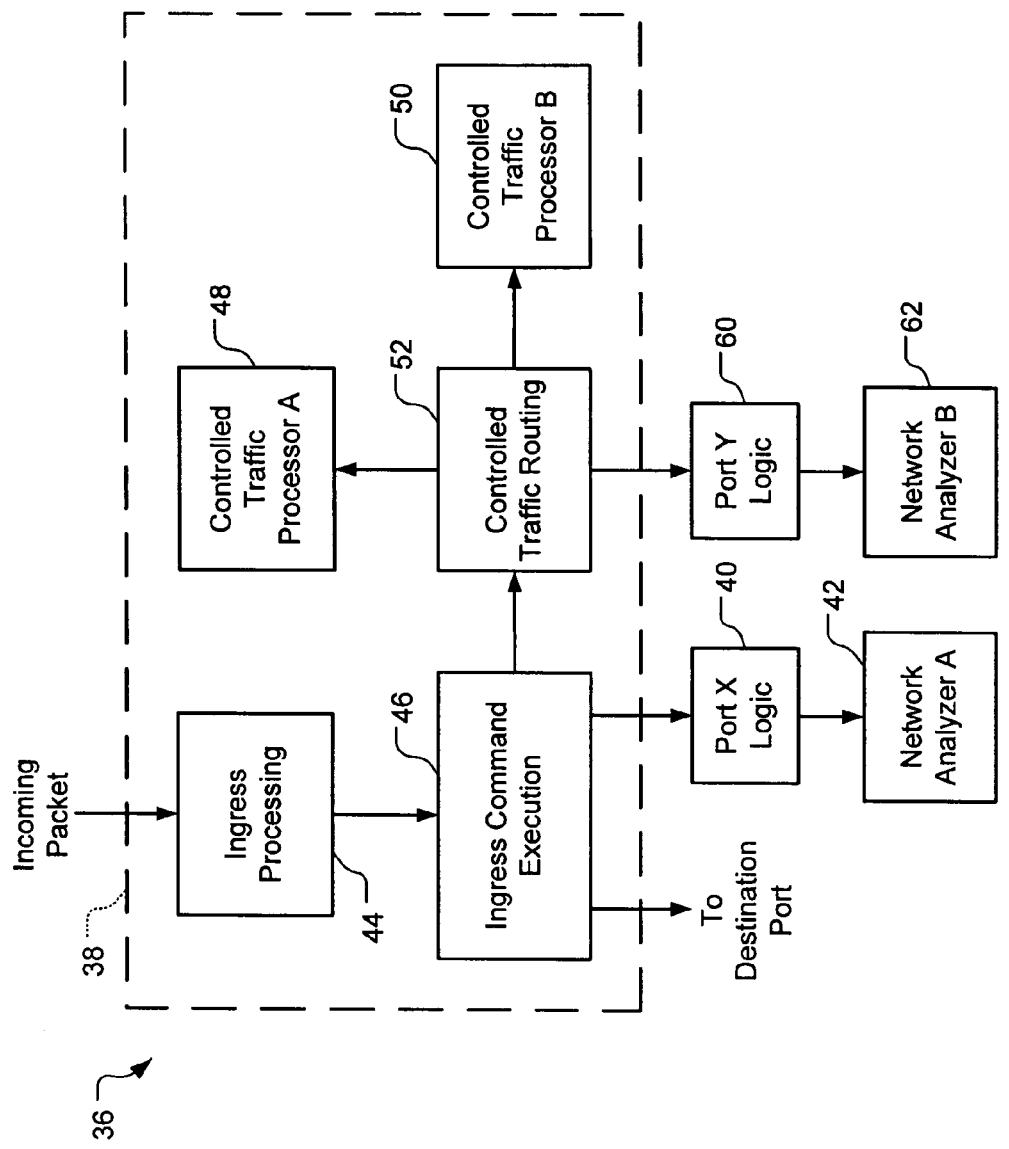
FIG. 4 is a functional block diagram of a packet processing module that supports multiple network traffic analysis devices using packet mirroring according to the present invention.

Referring now to FIG. 4, the packet processing module 38 of the present invention utilizes packet mirroring to facilitate multiple independent network traffic analysis sessions. The control traffic routing module 52 forwards mirrored packets to devices that are identified by the device interface codes. However, the control traffic routing module 52 does not know whether the target device is an actual control traffic processor. The Ethernet network device 36 includes a port logic module 60 (identified as "Y" in FIG. 4). A network traffic analysis device 62 (identified as "B" in FIG. 4) communicates with the port logic module 60.

A packet desired for network traffic analysis is tagged as belonging to the control traffic class at the ingress processing module 44. The ingress command execution module 46 then mirrors the incoming packet to generate a duplicate packet. The ingress command execution module 46 also generates a device interface code that corresponds with the port logic module 60 instead of a control traffic processor.

The control traffic routing module 52 receives the mirrored packet and the device interface code. The control traffic routing module 52 utilizes the look-up table to identify the device location corresponding with the device interface code. The control traffic routing module 52 handles this situation as if it is locating the appropriate control traffic processor for the mirrored packet. However, the device interface code actually corresponds with the port logic module 60. Therefore, the control traffic routing module 52 forwards the mirrored packet to the port logic module 60.

Referring now to FIG. 5, an exemplary look-up table 70 utilized by the control traffic routing module 52 includes control traffic codes. Exemplary control traffic codes illustrated in FIG. 5 are labeled A, B, C, D, and E. The control traffic codes correspond with the device interface codes generated by the ingress command execution module 46 and identify a system device. The control traffic routing module 52 matches each of the control traffic codes with a processor interface identifier. Exemplary processor interface identifiers illustrated in FIG. 5 are labeled 1, 2, 3, 4, and 5. Each of the interface identifiers corresponds with a system device. For example, the system device may be a control traffic processor 48 or 50 or a port logic module 40 or 60 with which a network traffic analysis device 42 or 62 communicates.

Therefore, the ingress processing module 44 is programmed to tag incoming packets from identified ports that are monitored by the network traffic analysis device 62 as belonging to the control traffic class. The ingress command execution module 46 is programmed to generate a device interface code that corresponds with the network traffic analysis device 62. Additionally, the control traffic routing module 52 is programmed to forward packets having the device interface code corresponding with the network traffic analysis device 62 to the port logic module 60.

While the network traffic analysis device 62 is directly connected to the Ethernet network device 36, it is not directly connected to the packet processing module 38. Therefore, the destination header of the duplicate packet is typically changed before the packet is forwarded to the port logic module 60. It is necessary to preserve the original destination headers of incoming packets to perform bona fide network traffic analysis. Therefore, the port logic module 60 is programmed to remove any additional destination headers and tags that may have been added to the packet and to regenerate the original destination header of the incoming packet. This is done to ensure that the packet received by the network traffic analysis device 62 is identical to the original incoming packet.

Referring now to FIG. 6, a network traffic analysis method begins in step 78. In step 80, the ingress processing module 44 reads an incoming packet. In step 82, control determines whether the packet is to be tagged for analysis by a secondary network traffic analysis device 62. If false, control proceeds to step 84. If true, control proceeds to step 86. In step 86, the ingress processing module 44 tags the packet as belonging to the control traffic class and control proceeds to step 84. In step 84, control determines whether the packet is tagged as belonging to the control traffic class. If true, control proceeds to step 88. If false, control proceeds to step 90.

In step 90, the ingress command execution module 46 forwards the incoming packet to an intended destination port of the Ethernet network device 36. Alternatively or additionally, the ingress command execution module 46 generates and forwards a copy of the incoming packet to the primary network traffic analysis device 62 and control ends. In step 88, the ingress command execution module 46 mirrors the incoming packet to generate a duplicate copy of the incoming packet.

The ingress command execution module 46 also generates a device interface code associated with the secondary network traffic analysis device 62. The ingress command execution module 46 then forwards the duplicate packet and the device interface code to the control traffic routing module 52. The ingress command execution module 46 also optionally forwards the incoming packet to an intended destination port of the Ethernet network device 36 in step 88.

In step 92, the control traffic routing module 52 utilizes the look-up table 70 to match the device interface code with a processor interface identifier that corresponds with the secondary network traffic analysis device 62. In step 94, the control traffic routing module 52 forwards the duplicate packet to the port logic module 60 and the port logic module 60 restores the original destination headers of the original incoming packet and control ends.

The method of the present invention may be utilized in any packet processing module 38 that includes multiple control traffic processors. In most cases, the packet processing module 38 can facilitate as many independent network traffic analysis sessions as there are unique codes for control traffic processors. For example, a packet processing module 38 may include two control traffic processors. However, the same packet processing module 38 may support up to eight or more unique control traffic processor codes. Any codes that are not utilized to send packets to the control traffic processors may be used as device interface codes in the ingress command execution module 46 to support additional network traffic analysis sessions. For example, a single code may be used to identify all traffic intended for control traffic processors. In this case, the remaining codes may be used to facilitate additional traffic analysis sessions.

The present invention provides for a variety of traffic analysis configurations. Individual ports may be monitored by independent network traffic analysis devices 62. Multiple network traffic analysis devices 62 may monitor the same port or same set of ports of the Ethernet network device 36. Also, since multiple control traffic codes may be used to identify traffic from a single port, a network traffic analysis device 62 may monitor selected portions of traffic from one or more ports. For example, a first network traffic analysis device 62 may monitor traffic of a first specified type from one or more ports. A second network traffic analysis device 62 may monitor traffic of a second specified type from one or more of the same or any of the remaining ports. At the same time, a third network traffic analysis device 62 may monitor all traffic from selected ones of all of the ports.

The ingress command execution module 46 is preferably capable of mirroring incoming packets to the control traffic routing module 52 as opposed to simply sending the packets. For example, a packet may be sent to a control traffic processor 48 or 50 when the processor 48 or 50 was not supposed to be the sole recipient of the packet. In this case, the processor 48 or 50 is required to generate additional traffic by sending the packet to all of the intended destinations, which creates a significant data load.

Mirroring creates a duplicate copy of the incoming packet and avoids burdening the control traffic processors. However, even if the ingress command execution module 46 is not capable of executing a mirror operation, multiple traffic analysis sessions are still possible. For example, the ingress command execution module 46 may first send a packet to a control traffic processor. The control traffic processor may then generate multiple copies of the packet. The control traffic processor may send one copy of the packet to its original intended destination and other copies of the packet to one or more attached network traffic analysis devices 62.

The present invention allows additional network traffic analysis devices 62 to receive packets that are identical to the original incoming packets. This is an improvement over previous systems that only send portions of packets to network traffic analysis devices 62. Meaningful network traffic analysis is more likely to occur when exact and complete copies of the incoming packets are used.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. An Ethernet network device, comprising:
   a first port logic module that is associated with a device port of the Ethernet network device and that is identified by a device interface code; and
   a packet processing module that includes:
      an ingress processing module that receives an incoming packet and that generates a control traffic tag;
      an ingress command execution module that receives said incoming packet and said control traffic tag, that generates a first duplicate packet that is identical to said incoming packet, and that generates the device interface code that identifies said first port logic module based on said control traffic tag; and
      a control traffic routing module independent of said ingress command execution module that receives said first duplicate packet and said device interface code and that selectively forwards said first duplicate packet to said first port logic module and at least one control traffic processor based on said device interface code.

2. A system comprising the Ethernet network device of claim 1 and further comprising a network traffic analysis device that communicates with said first port logic module and that receives said first duplicate packet.

3. The system of claim 2 wherein said Ethernet network device includes a second port logic module that transmits said incoming packet to said ingress processing module and wherein said ingress command execution module generates a device interface code that identifies said first port logic module when said network traffic analysis device monitors network traffic through said second port logic module.

4. A system comprising the Ethernet network device of claim 1 and further comprising a network traffic analysis device, wherein said Ethernet network device includes a second port logic module, said ingress command execution module generates a second duplicate packet that is identical to said incoming packet and forwards said second duplicate packet to said second port logic module, and said network traffic analysis device communicates with said second port logic module and receives said second duplicate packet.

5. The Ethernet network device of claim 1 wherein said first port logic module replaces a first destination header of said first duplicate packet with a second destination header that is identical to a destination header of said incoming packet.

6. A system comprising the Ethernet network device of claim 1 and further comprising a network traffic analysis device, wherein said Ethernet network device includes a second port logic module that transmits said incoming packet to said ingress processing module and wherein said ingress processing module generates said control traffic tag when said network traffic analysis device monitors network traffic through said second port logic module.

7. The Ethernet network device of claim 1 wherein said packet processing module includes the at least one control traffic processor and wherein said control traffic routing module forwards a first packet to said control traffic processor when a device interface code of said first packet identifies an interface between said control traffic processor and said control traffic routing module.

8. A system comprising the Ethernet network device of claim 1 and further comprising a second port logic module, wherein said ingress command execution module forwards said incoming packet to said second port logic module when a destination header of said incoming packet identifies said second port logic module.

9. The Ethernet network device of claim 1 wherein the Ethernet network device is a local area network (LAN) switch.

10. An Ethernet network device, comprising:
   first port processing means for sending/receiving packets that is associated with a device port of the Ethernet network device and that is identified by a device interface code; and
   packet processing means for processing packets that includes:
      ingress processing means for receiving an incoming packet and for generating a control traffic tag;
      ingress command executing means for receiving said incoming packet and said control traffic tag, for generating a first duplicate packet that is identical to said incoming packet, and for generating the device interface code that identifies said first port processing means based on said control traffic tag; and
      control traffic routing means independent of said ingress command executing means for receiving said first duplicate packet and said device interface code and for selectively forwarding said first duplicate packet to said first port processing means and at least one control traffic processor based on said device interface code.

11. A system comprising the Ethernet network device of claim 10 and further comprising network traffic analyzing means, that communicates with said first port processing means, for receiving said first duplicate packet.

12. The system of claim 11 wherein said Ethernet network device includes second port processing means for sending/receiving packets that transmits said incoming packet to said ingress processing means and wherein said ingress command executing means generates a device interface code that identifies said first port processing means when said network traffic analyzing means monitors network traffic through said second port processing means.

13. A system comprising the Ethernet network device of claim 10 and further comprising network traffic analyzing means for analyzing network traffic, wherein said Ethernet network device includes second port processing means for sending/receiving packets, said ingress command executing means generates a second duplicate packet that is identical to said incoming packet and forwards said second duplicate packet to said second port processing means, and said network traffic analyzing means communicates with said second port processing means and receives said second duplicate packet.

14. The Ethernet network device of claim 10 wherein said first port processing means replaces a first destination header of said first duplicate packet with a second destination header that is identical to a destination header of said incoming packet.

15. A system comprising the Ethernet network device of claim 10 and further comprising network traffic analyzing means for analyzing network traffic, wherein said Ethernet network device includes second port processing means for transmitting said incoming packet to said ingress processing means and wherein said ingress processing means generates said control traffic tag when said network traffic analyzing means monitors network traffic through said second port processing means.

16. The Ethernet network device of claim 10 wherein said packet processing means includes the at least one control traffic processor and wherein said control traffic routing means forwards a first packet to said control traffic processor when a device interface code of said first packet identifies an interface between said control traffic processor and said control traffic routing means.

17. A system comprising the Ethernet network device of claim 10 and further comprising second port processing means for sending/receiving packets, wherein said ingress command executing means forwards said incoming packet to said second port processing means when a destination header of said incoming packet identifies said second port processing means.

18. The Ethernet network device of claim 10 wherein the Ethernet network device is a local area network (LAN) switch.

19. A method for operating an Ethernet network device that includes a first port logic module associated with a device port of the Ethernet network device and that is identified by a device interface code, comprising:
   receiving an incoming packet;
   generating a control traffic tag that is associated with said incoming packet;
   generating a first duplicate packet that is identical to said incoming packet based on said control traffic tag;
   generating the device interface code that identifies the first port logic module based on said control traffic tag; and
   selectively forwarding said first duplicate packet to the first port logic module and at least one control traffic processor based on the device interface code.

20. The method of claim 19 wherein the Ethernet network device includes a network traffic analysis device that communicates with the first port logic module and that receives said first duplicate packet.

21. The method of claim 20 further comprising:
   supplying a second port logic module, wherein said incoming packet enters the Ethernet network device via said second port logic module; and
   generating a device interface code that identifies the first port logic module when said network traffic analysis device monitors network traffic through said second port logic module.

22. The method of claim 19 further comprising:
   supplying a second port logic module;
   supplying a network traffic analysis device;
   generating a second duplicate packet that is identical to said incoming packet; and
   forwarding said second duplicate packet to said second port logic module, wherein said network traffic analysis device communicates with said second port logic module and receives said second duplicate packet.

23. The method of claim 19 further comprising replacing a first destination header of said first duplicate packet with a second destination header that is identical to a destination header of said incoming packet after said forwarding step.

24. The method of claim 19 further comprising:
supplying a second port logic module, wherein said incoming packet enters the Ethernet network device via said second port logic module;
supplying a network traffic analysis device; and
generating said control traffic tag when said network traffic analysis device monitors network traffic through said second port logic module.

25. The method of claim 19 further comprising:
supplying the at least one control traffic processor; and
forwarding a first packet to said control traffic processor when a device interface code of said first packet identifies an interface of said control traffic processor.

26. The method of claim 19 further comprising:
supplying a second port logic module; and
forwarding said incoming packet to said second port logic module when a destination header of said incoming packet identifies said second port logic module.

27. The method of claim 19 wherein the Ethernet network device is a local area network (LAN) switch.

* * * * *